(12) United States Patent
Bromberg (10) Patent No.: US 10,804,605 B2
(45) Date of Patent: Oct. 13, 2020

(54) CALIBRATION USING QUATERNIONIC SCATTERING MODELS

(71) Applicant: BAE SYSTEMS Information and Electronic Systems Integration Inc., Nashua, NH (US)

(72) Inventor: Matthew C. Bromberg, Leominster, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 323 days.

(21) Appl. No.: 15/869,306

(22) Filed: Jan. 12, 2018

(65) Prior Publication Data
US 2019/0221930 A1    Jul. 18, 2019

(51) Int. Cl.
*H01Q 3/26* (2006.01)
*G06F 17/11* (2006.01)

(52) U.S. Cl.
CPC .......... *H01Q 3/267* (2013.01); *G06F 17/11* (2013.01)

(58) Field of Classification Search
CPC ................. G06F 17/11; H01Q 3/267
See application file for complete search history.

(56) References Cited

U.S. PATENT DOCUMENTS

| | | | |
|---|---|---|---|
| 2012/0163557 A1* | 6/2012 | Hsieh | A61B 6/583 378/207 |
| 2013/0073070 A1* | 3/2013 | Tsai | G01N 21/47 700/103 |
| 2014/0032190 A1* | 1/2014 | Shlepnev | G01B 15/08 703/2 |
| 2016/0209488 A1* | 7/2016 | Zietz | G01R 35/005 |
| 2017/0086796 A1* | 3/2017 | Watanabe | G01S 7/52026 |

* cited by examiner

*Primary Examiner* — Timothy X Pham
(74) *Attorney, Agent, or Firm* — KPIP Law, PLLC; Scott J. Asmus (57) ABSTRACT

The system and method of calibrating a receiver array using a quaternionic scattering model. The calibration method is model based, quick, and suitable for sparse sampling of the array. The calibration scheme can be cheaply and rapidly deployed, either from operational test data or from rapid ground calibration experiments. The model allows for closed loop calibration repair during actual geolocation or line of bearing collects.

13 Claims, 5 Drawing Sheets

CALIBRATION USING QUATERNIONIC SCATTERING MODELS

FIELD OF THE DISCLOSURE

The present disclosure relates to the calibration of receiver arrays and more particularly to calibration of receiver arrays using quaternionic scattering models.

BACKGROUND OF THE DISCLOSURE

It is generally the case that unforeseen scattering environments occur when deploying antenna arrays in the field. These antenna/receiver arrays may be used for identifying targets in a military context. In other cases, the target might be some other object of unknown location. In some cases the exact location of the array may also be unknown and thus a calibration method is needed. Often times this makes the expensive anechoic chamber calibration of limited use. An anechoic chamber is a room free from echo (or reflection, or scattering) and designed to completely absorb reflections of either sound or electromagnetic waves. This solution has little application for cases where the antennas are to be deployed in the field.

Wherefore, it is an object of the disclosure to overcome the above-mentioned shortcomings and drawbacks associated with the conventional calibration methods for receiver arrays.

SUMMARY OF THE DISCLOSURE

It has been recognized that a new calibration scheme for receiver arrays was needed. In one embodiment, a calibration method that is model based, quick, and suitable for sparse sampling of the array was developed. A calibration scheme that could be cheaply and rapidly deployed, either from operational test data or from rapid ground calibration experiments is described herein. Moreover, in some cases, the model allows for closed loop calibration repair during actual geolocation or line of bearing collects.

One aspect of the present disclosure is a A method of calibrating one or more receivers using a quaternionic scattering model, comprising: analyzing the one or more receivers to determine a set of initial scattering positions for one or more scatterers, where the initial scattering position is $x_q$ and $q=1 \ldots Q$; performing a calibration to collect K points at K known relative emitter positions pk; $k=1 \ldots K$; maximizing an objective function $T_r Z^H P(B) Z$ over $x_q$, while holding all the other $x_r$ fixed, where $r \neq q$; for $q=1 \ldots Q$; selecting a minimum least squares scattering coefficient solution according to $D = B^H B^{-1} B^H Z$, for an optimal B found in the maximizing step; and generating a calibrated array model, $a(p) = D^T b(p)$.

One embodiment of the method of calibrating one or more receivers using a quaternionic scattering model is wherein the maximizing step is reiterated to include poorly known emitter locations.

Another aspect of the present disclosure is a method of calibrating one or more receivers using a quaternionic scattering model, comprising: calibrating all components of E dipole (3) and H loop (3) fields for a total of six vector sensors; calibrating both the vertical and horizontal propagation modes for polarization diverse arrays; and utilizing a least squares fit to a set of basis functions that approximate a local solution to a wave equation, wherein one such set of basis functions is a set of point source scatterers of the form:

$$A_m = \Sigma q(d_{mq} \exp(k(ct-r_q)j) + \tilde{d}_{mq} \exp(-k(ct-r_q)j))/r_q$$

where Am is the electromagnetic four potential in quaternion form for sensor m, where an electromagnetic four-potential is a relativistic vector function from which the electromagnetic field can be derived.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Previous methods of identifying location use geolocation or direction finding based on maximum likelihood principles. One method, correlation interferometer geolocation (CIGL), deals with the geolocation solution for potentially ambiguous arrays using a likelihood surface calculation that integrates away false ambiguities over the course of a collection flight, leaving an unbiased target solution that adheres to a maximum likelihood estimator.

Applicant's own Copy-Aided Geolocation (CAGL) extends the successful copy-aided paradigm to the geolocation problem. By modeling the received energy as consisting of two components, a known signal and an interference signal, and by presuming that interference is Gaussian, but the signal of interest (SOI) is not, a closed form solution can be obtained for the maximum likelihood function. In CAGL, the maximum likelihood function depends on the position of the SOI. The likelihood function of CAGL is evaluated over a grid of position hypotheses to find the peak likelihood. CAGL requires a calibrated array much like most angle-based geolocation techniques. The present disclosure relates to such a calibration scheme using quaternionic scattering models that is of particular use in geolocation applications.

CAGL greatly outperforms pure direction finding based geolocation techniques such as the Stansfield algorithm by an order of magnitude or more even in non-interference environments. In interference environments, CAGL greatly outperforms correlation interferometry geolocation (CIGL), which fails completely as the interference power increases.

It is understood that co-channel interference is a common problem in reconnaissance, especially for airborne platforms. These systems often operate in cellular environments or other types of networks where multiple co-channel transceivers are present. Given an array of antennas it is important to be able to geolocate targets of interest based on weak signal properties while in a noisy environment. In addition to a standard co-channel environment, in certain military applications the presence of jammers and the like can further complicate the geolocation of targets. It is very important to be able to calibrate these systems to provide for accurate results regardless of the environmental conditions.

A surveillance system can be deployed in environments where the targets of interest have not been fully characterized, or where it is prohibitive to do so. In such systems it is necessary to be able to classify and geolocate targets based on weak signal properties and in a noisy environment. Techniques that rely simply on sampling the receiver energy will not work effectively in such co-channel interference environments.

In contrast to CIGL, CAGL has proven itself in several airborne collection environments where co-channel cellular interference was present. In those co-channel interference environments, all other algorithms failed to work effectively. Numerical experiments have shown that CAGL actually asymptotically adheres to the optimal Cramer Rao Bound, a mathematical performance limit of how good an estimator can be in an ideal situation. Thus, for sufficient SNR or collection samples one cannot actually perform better than CAGL for obtaining a position estimate for a SOI.

In addition to defense applications, CAGL has several commercial applications. These include cell phone localization for towers equipped with multiple antennas or indoor localization for RFID tagged products or appropriately equipped communications devices, and the like. The commercial applications may require that the object being localized is in the RF range of multiple base station transceivers. However, the performance is considered to be orders of magnitude better than existing solutions. This disclosure applies to electromagnetic arrays in controlled geometries, as well as to randomly-spaced arrays that may be scattered (e.g., as from an aircraft.) In some cases, applications may include defense applications, such as tracking aircraft, vehicles, and dismounts; law-enforcement applications, such as monitoring suspicious activity unobtrusively through walls and obscurations; and medical applications such as non-intrusive monitoring of dementia patients in complex environments.

In order to achieve the desired performance bounds for detection and geolocation, it is necessary to calibrate the receiver arrays. One embodiment of the present disclosure is a calibration scheme for antenna arrays using quaternionic scattering models. In one embodiment of the present disclosure, the method utilizes a very general point source solution of the wave equation derived via a quaternionic formulation of Maxwell's equations. The quaternionic formulation can be used directly, and in this formulation there is the possibility of extending the point source basis functions via a generalization of conformal mappings to more arbitrary receiver geometries. The simple point source scattering solution works surprisingly well in practice in most receiver platforms. In some embodiments, the method of calibration may be used in aquatic applications as well where hydrodynamic equations would be utilized.

Certain embodiments of the scattering model do not require a calibration table, beyond a small set of scattering coefficients, unlike conventional techniques. The model of the present disclosure has proven to be good at interpolation and allowing calibration over very small data sets. In some cases, the data sets do not necessarily require a complete covering of the manifold. This is in contrast to prior methods which require an expensive sampling of the entire unit sphere.

The fact that the model of the present disclosure uses a least squares fit over a small set of free parameters, allows it to be more robust in the presence of multipath via least squares smoothing. It is known that tabulated calibration tables underperform in bad collection environments. The smaller data sets in the present model allow for cheaper calibration, calibration in the field, and with some extensions a closed-loop calibration during operation and/or testing. With closed-loop calibration, feedback from the multiple nodes in the sensor network is used to improve the accuracy of the network without outside intervention.

In another embodiment, perturbation of the electrical centers of the scatterers while optimizing the least squares fit to the observed aperture data is utilized so that the data itself determines where the scatterers should be, enabling self-calibration of an ad hoc sensor network. In yet another embodiment, the array model can be extended to exploit additional features such as range modeling and/or bulk phase modeling based on carrier frequency.

In one example of the present disclosure, the model proved crucial when a faulty connection invalidated an entire calibration set. Fortunately, a small set of data collections were able to be used in place of a calibration table and accurate geolocation results were achieved.

In one embodiment, the model assumes a fixed number of re-radiating point scatterers on the array. In some cases, the model remains valid over a range of frequencies and is range dependent. In certain embodiments, the model is utilized for frequencies ranging from KiloHertz to TeraHertz.

In one embodiment for calibrating electromagnetic vector sensors the method calibrates all components of the E dipole (3) and H loop (3) fields for a total of six vector sensors and calibrates both the vertical and horizontal propagation modes for polarization diverse arrays. In certain embodiments, the calibration approach makes use of a least squares fit to a set of basis functions that approximate a local solution to the wave equation. One such set of basis functions successfully used for this purpose is a set of point source scatterers of the form:

$$A_m = \Sigma q (d_{mq} \exp(k(ct-r_q)j) + \tilde{d}_{mq} \exp(-k(ct-r_q)j))/r_q \qquad \text{Eq. (1)}$$

where $A_m$ is the electromagnetic four potential in quaternion form for sensor m, where an electromagnetic four-potential is a relativistic vector function from which the electromagnetic field can be derived. It combines both an electric scalar potential and a magnetic vector potential into a single four-vector; $r_{q=\|x_q-p\|}$ is the distance from the transmitter p to the $q^{th}$ scatterer, $x_q$, c is the speed of light, t is time, k is the wavenumber, $d_{mq}$ and $\tilde{d}_{mq}$ are quaternion scattering coefficients and j is a unit quaternion in the direction of the emitter current source. This model compactly captures polarization and local scattering impinging on the antenna array.

Some features of the present calibration method are that it provides a compact depiction of polarization via the vector four-potential. In some cases, it is convenient for describing vector sensors and it has no need to convert to an Azimuth/Elevation format and so it saves trigonometric computation. In certain embodiments, the present calibration model can exploit 4-D conformal mapping solutions and orthogonal polynomials, facilitating solutions of complex equations. Conformal mapping allows the equations to be transformed into coordinates which are locally more-convenient to solve or visualize. Re-casting the complex fields as expansions in orthogonal-polynomial bases allows faster computations and more-compact representations.

Certain embodiments of the present calibration method permit the inclusion of range into an array calibration table. In some cases, the calibration method allows an array to be calibrated when only sparsely sampled. In some embodiments, it can utilize Fueter polynomials and quaternion spherical harmonics to simplify the array model, while giving physical meaning to the imaginary unit j (e.g., unit current vector of an emitter).

In certain cases one may not have access to a full six element vector sensor array. In some embodiments, the scattering model is used over an arbitrary set of array elements. One can still deploy the quaternion formulation, but it is also possible to use a standard complex baseband formulation. In that formulation, the baseband complex data is treated as a sampling of the voltage received as a function of the unit emitter source quaternion j, without specifying the direction of the source. In certain embodiments, if only one component of the vector four potential is sampled, then the problem is reduced to the complex baseband case.

Eq. (1) can be written in matrix form as, $$a^T(p) = b^T(p) D$$

$$b_q(p) = \exp(k_q(ct - r_q)j)/r_q$$

$$D_{qm} = d_{mq}.$$

Half of the q indices are devoted to the conjugate solution and the other half of the q indices are devoted to the normal analytic solution. For the conjugate solution, $k_q = -k$ and otherwise $k_q = k$ wherein $k = 2\pi F/c$ is the wavenumber and F is the carrier frequency. The length Q row vector $b^T(p)$ is the set of basis functions as a function of the emitter position p. In certain embodiments, a simple point scattering model is presumed for the array, but one could use conformal basis functions derived from various receiver geometries as well. However, point scattering functions suffice in most cases.

In one embodiment, during the calibration process K observations of the array vector, usually obtained via simple matched filter techniques, are used. For the k'th observation there is a k'th relative position vector $p_k$ and an associated M dimensional array observation vector $z_k$ such that $z_k = a(p_k) + e_k$ for some additive white Gaussian noise, where the observation error is $e_k$. By stacking each $z_k$ as the k'th row vector of the matrix Z, and each $b(p_k)$ as the k'th row of the B matrix, the matrix equation, $Z = BD + E$ is obtained, where E is a K×M white Gaussian noise error matrix, with independent components, and D is a Q×M coefficient matrix that defines the reflection coefficients of the scatterers in the scattering model.

From this formulation it is not hard to see that the likelihood function is the negative mean square error function given by, $$\mu = T_r((Z-BD)^H(Z-BD)),$$

where $T_r(\cdot)$ is the matrix trace operator. If unknown deterministic scattering coefficients are assumed, an estimation for them in closed form is possible by solving the first order necessary conditions that arise from minimizing µ over D, $$\frac{\partial \mu}{\partial D*} = B^H (BD - Z) = 0$$

Thus $D = (B^H B)^{-1} B^H Z$ and therefore, $\mu = T_r(Z^H Z) - T_r(Z^H P(B) Z)$, where $P(B) = B(B^H B)^{-1} B^H$ is the matrix projection operator.

It is to be expected that in certain cases one only knows the approximate positions of the scatterers in the receiver array. Normally, one uses the antenna positions themselves as scatterers, but even those may not be known precisely. Thus, if one treats µ as a function of the $x_q$ and permits a local optimization of the $x_q$ parameters, a local search using a conjugate gradient or Powell's method can be performed over each $x_q$ independently. In certain embodiments, the optimization is performed via alternating directions, while holding all the scatterer positions fixed except for one of them.

Figure 5:
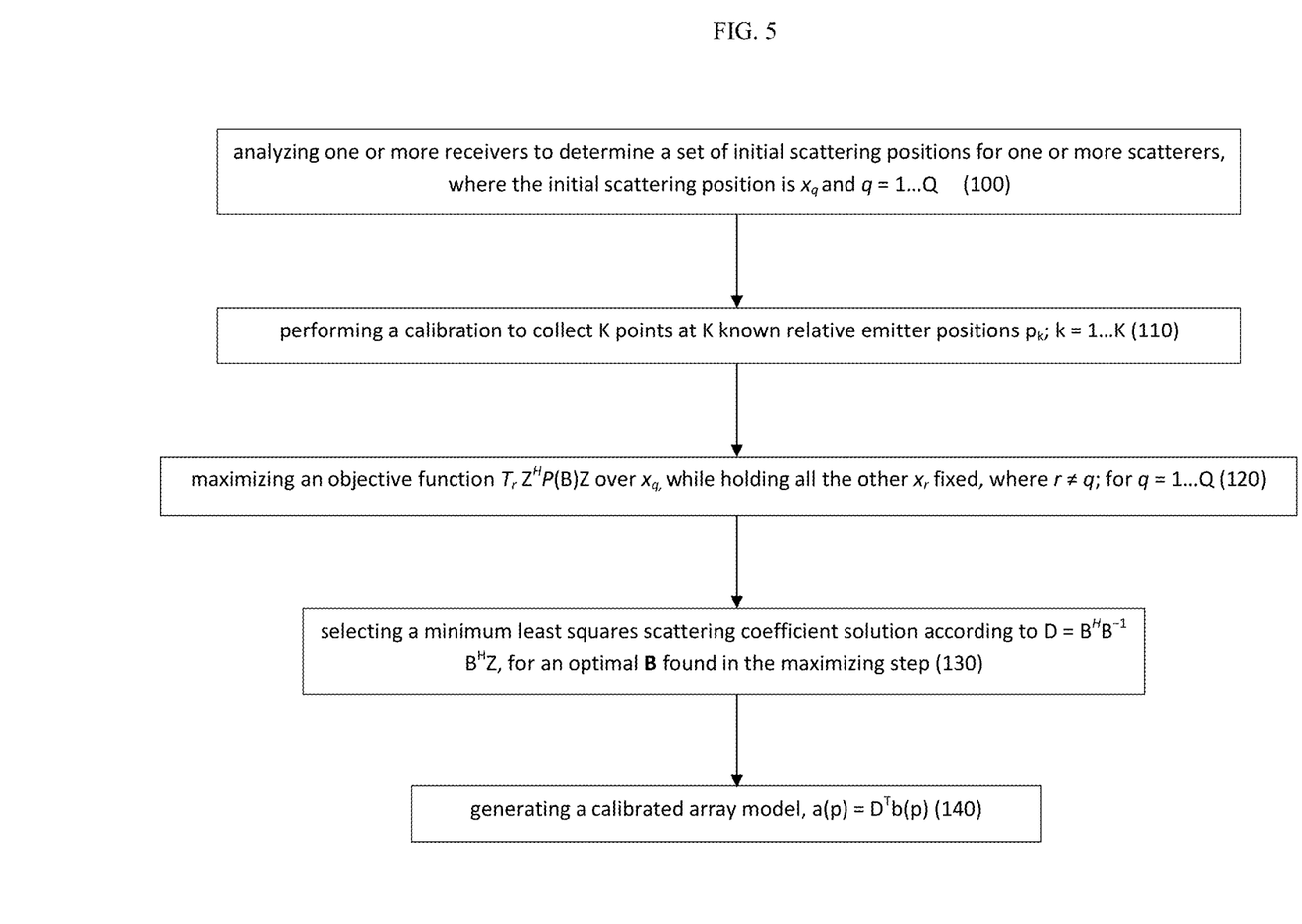
FIG. 5 is a flowchart of one embodiment of a method of calibrating an antenna array according to the principles of the present disclosure.

Referring to FIG. 5, a flowchart of one embodiment of the method according to the principles of the present disclosure is shown. More specifically, one embodiment of the calibration technique of the present disclosure is as follows. First, the array is analyzed to determine a set of initial scattering positions $x_q$; q=1 ... Q. Second, a calibration is performed to collect K points at K known relative emitter positions $p_k$; k=1 ... K: In some cases, the measured steering vectors are stacked as rows in a K×M complex matrix Z. Third, the objective function $T_r Z^H P(B) Z$ is maximized over $x_q$; while holding all the other $x_r$ fixed, r≠q; for q=1 ... Q. In certain embodiments, the third step is reiterated so as to include poorly known emitter locations. Fourth, the minimum least squares scattering coefficient solution $D = B^H B^{-1} B^H Z$ is selected, for the optimal B found in the third step. Finally, the calibrated array model becomes, $a(p) = D^T b(p)$.

Figure 1:
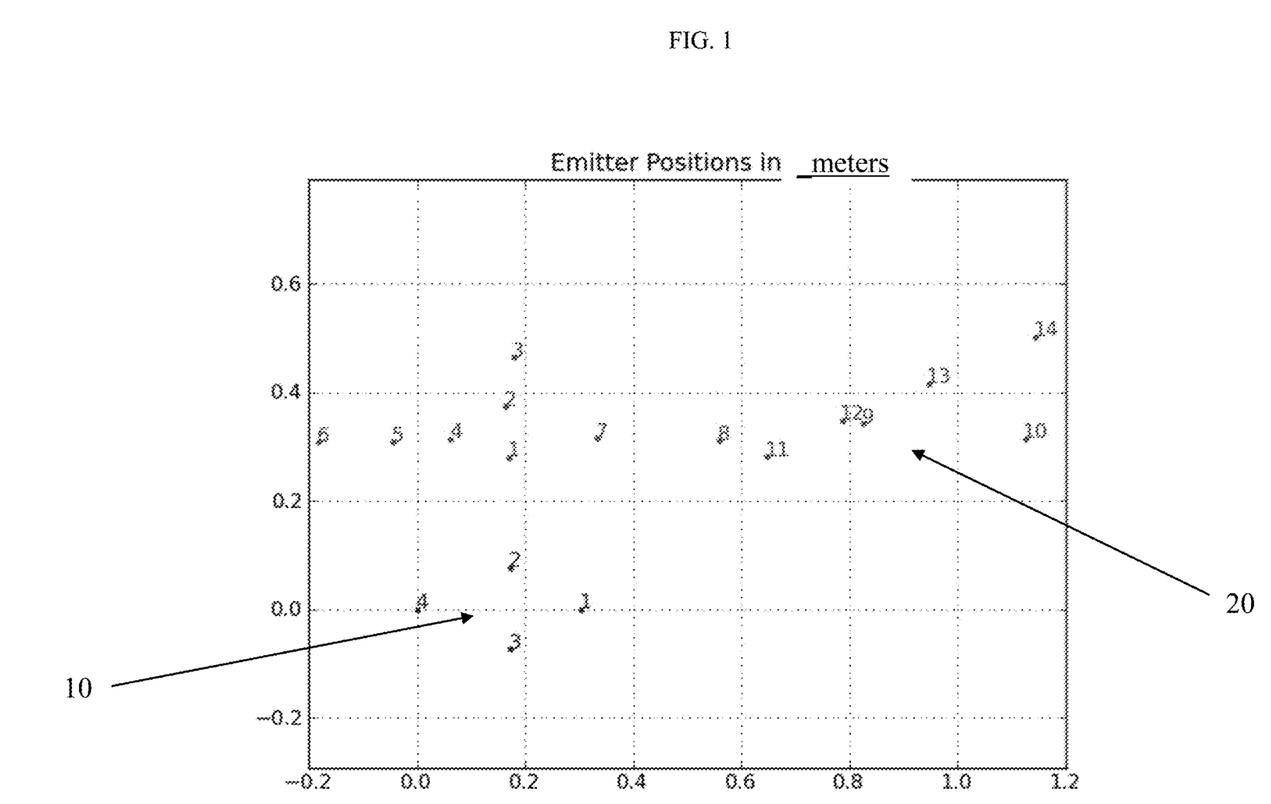
FIG. 1 shows one example of the scattering model used in calibration of an antenna array used in geolocation.

Referring to FIG. 1, one example of the scattering model used in calibration of an antenna array used in geolocation is shown. More specifically, a four element array 10 is calibrated using a 14 scatterer model 20. The range was calibrated into the array so that a single nearby emitter could be geolocated with high precision off of a single collect. This method is useful for both single site and multi-site receiver arrays. The four blue-colored points are antenna loci for the array being calibrated. The fourteen green-colored points are scatterers which are not part of the antenna array. Once the scatters and antenna array have been characterized, very precise localization of new emitters or scatterers is possible.

Still referring to FIG. 1, one embodiment of a calibration experiment according to the principles of the present disclosure is shown. More particularly, data was collected over a grid of points. The scattering model was fit to the data. In some cases, the model depends on both range and angle of arrival (AOA). While the CAGL geolocation is not dependent on range information, the range information may improve the solution locally. In one embodiment, averaging over many points gave the best fit, and mitigated multipath.

Figure 2:
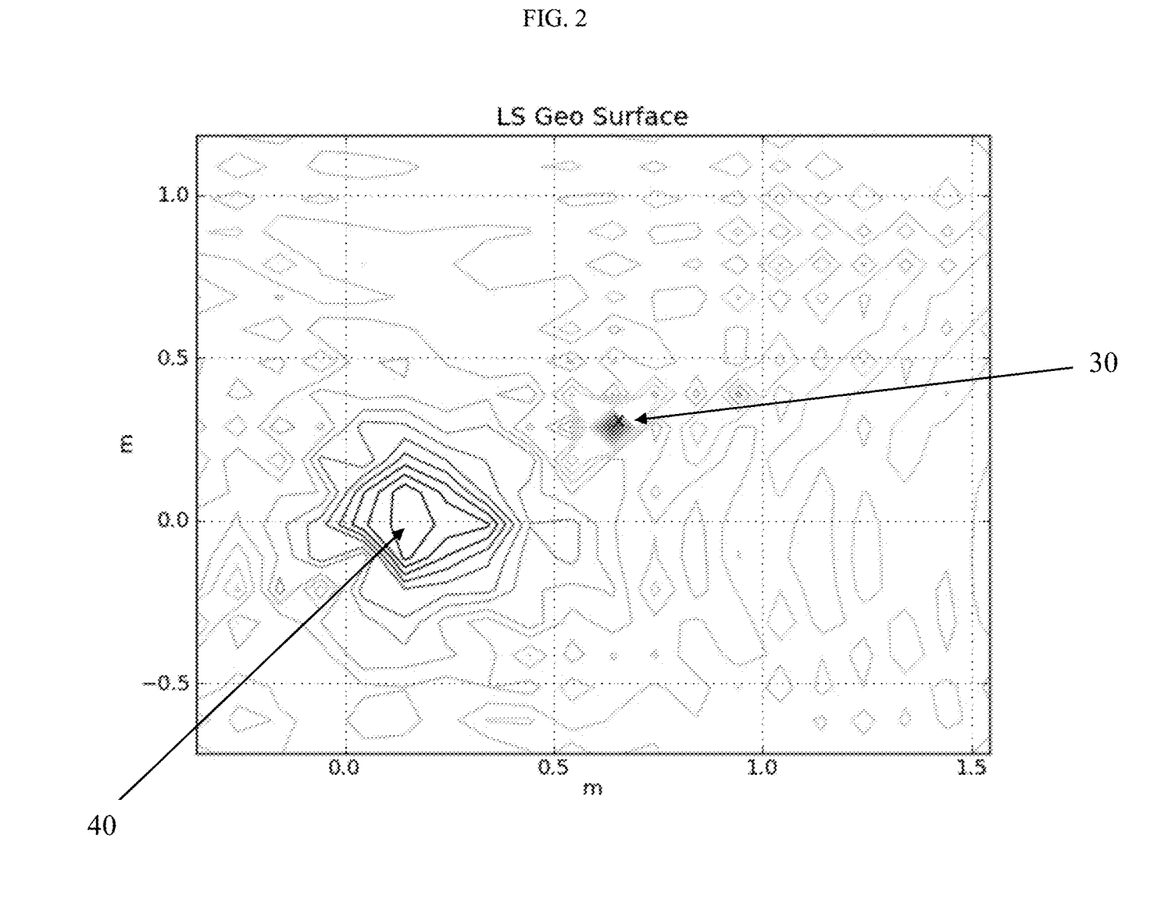
FIG. 2 shows one embodiment of a geolocation consistency check according to the principles of the present disclosure.

Referring to FIG. 2, one embodiment of a geolocation consistency check according to the principles of the present disclosure is shown. More specifically, in one case, four scatterers were assumed, with one at each antenna. In that case, only one of four possible waveforms was used for each point source scatterer. This was a forward time, unconjugated solution. In certain cases, sixteen complex weights were used in linear regression (i.e., 64 total equations). The normalized array model error was −13 dB. A simple least squares fit geolocated one emitter 30. In some cases, near the array, geolocation is possible from a single collect. The antenna array 40 is a set of scatters that is solved for by the regression, with loci enclosed by the blue-colored contours. The target emitter 30 was geolocated to high accuracy from a single measurement.

Figure 3A:
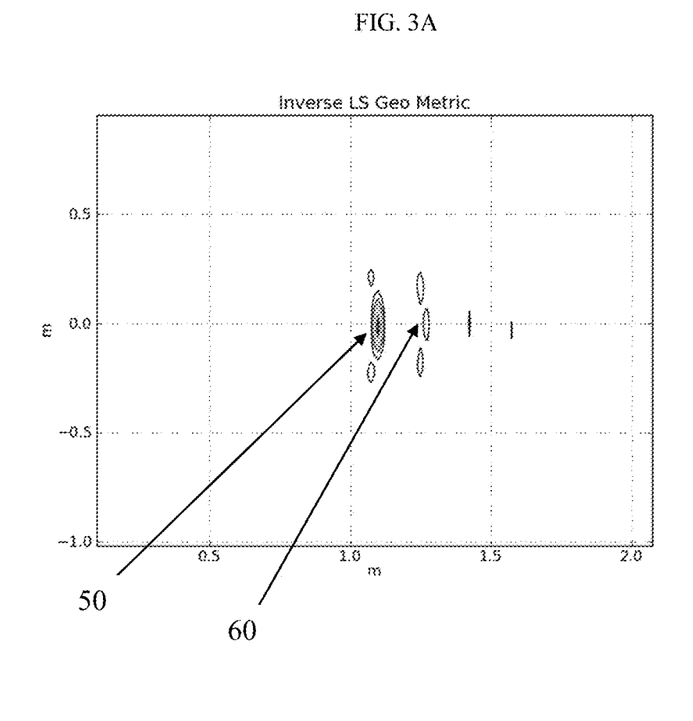
FIG. 3A shows a near field geolocation result for one embodiment of the present disclosure.

Referring to FIG. 3A, near field geolocation results for one embodiment of the present disclosure is shown at resolution. In one embodiment, a single position (e.g., a stationary receiver) collect was used and the system was calibrated over three different ranges using a lab rotator. In some cases, two wave equation solutions with twelve scatterers in the array model were used. Here, the signal of interest 50 was detected and out of range solutions (e.g., 60) at the same AoA were rejected. This can occur, for example, when two antenna have the same bearing (AoA) but are located at different distances from the emitter, creating ambiguity. In certain embodiments, to address this issue a threshold is set and responses below the threshold are discarded. The final accepted solution 50 is shown in FIG. 3B.

Figure 3B:
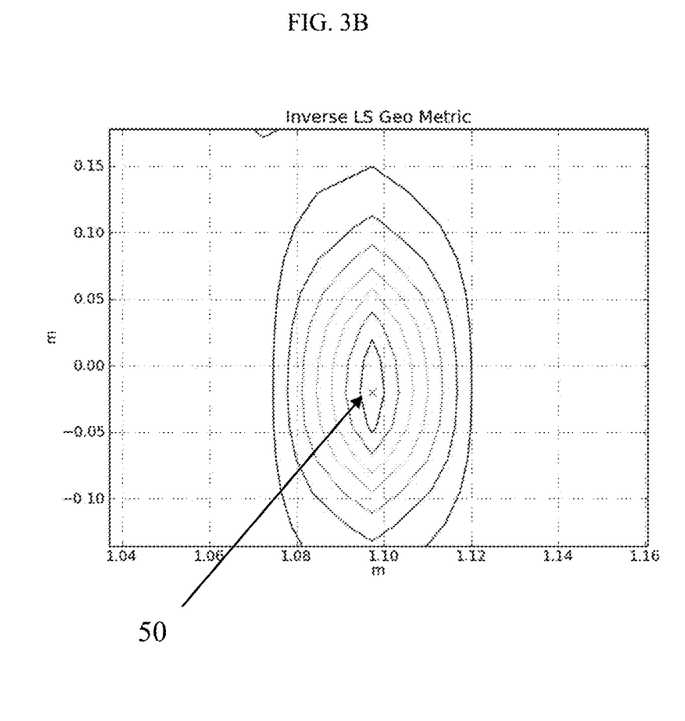
FIG. 3B shows a near field geolocation result for one embodiment of the present disclosure.

Referring to FIG. 3B near field geolocation results for one embodiment of the present disclosure is shown at resolution. More specifically, the error in the method is less than about 3 mm and the geolocation solution 50 has millimeter accuracy in the nearfield. In this case, the signal was a 1.9 GHz wideband signal. A four element array was calibrated using a 12 scatterer model. The range was fully calibrated into the array so that a single nearby emitter could be geolocated with high precision off of a single collect. This method is useful for both single site and multi-site receiver arrays. In some embodiments, incorporating more information into the calibration table along with fully polarization diverse calibration leads to improved performance.

Figure 4:
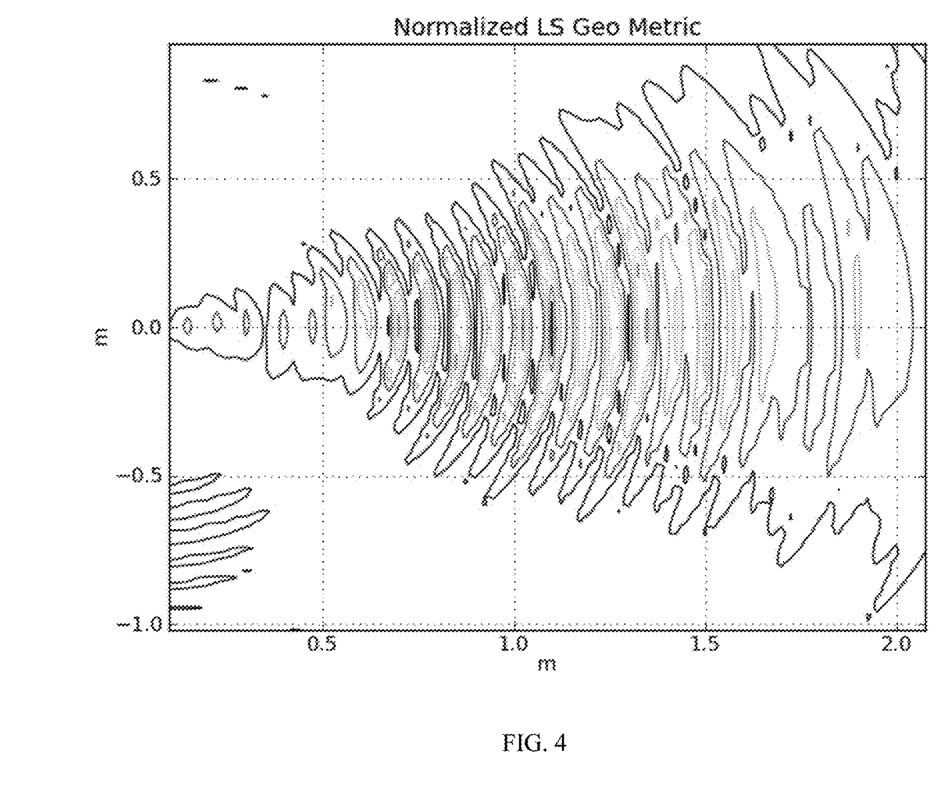
FIG. 4 shows one embodiment of normalized least squares geolocation according to the principles of the present disclosure.

Referring to FIG. 4, one embodiment of normalized least squares geolocation result according to the principles of the present disclosure is shown. More specifically, certain embodiments of the present disclosure assume an unknown complex propagation gain over all dwells of the collect. In some cases, this loses some range bearing information. This shows that the range and bearing to target can become more ambiguous if the complex propagation gains are unknown. The least-squares method still provides a solution, though further disambiguation algorithms must be applied to select the best-fit.

The calibration model of the present disclosure can be used in many geolocation applications. In one example, the antenna/sensor may be flying over one or more fixed target. In another example, an array of fixed sensors/antennas may be looking for one or more moving objects. In certain embodiments, one does not need to know where the scatterers are or even precisely where the one or more sensors/antennas are located. In certain embodiments, a series of antennas may be deployed into an area and the calibration method can be used to precisely locate the components of the array.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of calibrating one or more receivers using a quaternionic scattering model, comprising:

analyzing the one or more receivers to determine a set of initial scattering positions for one or more scatterers, wherein the set of initial scattering positions is $x_q$ and $q=1 \ldots Q$;

performing a calibration to collect K points at K known relative emitter positions $p_k$; k=1 ... K;

maximizing an objective function $T_r Z^H P(B) Z$ over $x_q$, while holding all the other $x_r$ fixed, where r≠q; for q=1 ... Q;

selecting a minimum least squares scattering coefficient solution according to $D=B^H B^{-1} B^H Z$, for an optimal B found in the maximizing step;

generating a calibrated array model, $a(p)=D^T b(p)$; and performing geolocation of at least one signal with the one or more receivers using the calibrated array model to a location of an emitter.

2. The method of calibrating one or more receivers using a quaternionic scattering model of claim 1, further comprising reiterating the maximizing step to include poorly known emitter locations.

3. The method of calibrating one or more receivers using a quaternionic scattering model of claim 1, wherein the one or more receivers are part of a cellular base station.

4. The method of calibrating one or more receivers using a quaternionic scattering model of claim 3, wherein the emitter is a cell phone.

5. The method of calibrating one or more receivers using a quaternionic scattering model of claim 1, wherein geolocation is Copy-Aided Geolocation (CAGL).

6. The method of calibrating one or more receivers using a quaternionic scattering model of claim 1, wherein the one or more receivers are indoors and the emitter is an RFID tagged product or person.

7. The method of calibrating one or more receivers using a quaternionic scattering model of claim 1, wherein the one or more receivers are on an airborne platform.

8. A computer program product including one or more non-transitory machine-readable mediums having instructions encoded thereon that, when executed by one or more processors, result in a plurality of operations for calibrating one or more receivers using a quaternionic scattering model, the operations comprising:

analyzing the one or more receivers to determine a set of initial scattering positions for one or more scatterers, wherein the set of initial scattering positions is $x_q$ and q=1 ... Q;

performing a calibration to collect K points at K known relative emitter positions $p_k$; k=1 ... K;

maximizing an objective function $T_r Z^H P(B) Z$ over $x_q$, while holding all the other $x_r$ fixed, where r≠q; for q=1 ... Q;

selecting a minimum least squares scattering coefficient solution according to $D=B^H B^{-1} B^H Z$, for an optimal B found in the maximizing step; and generating a calibrated array model, $a(p)=D^T b(p)$.

9. The computer program product of claim 8, further comprising performing geolocation of at least one signal with the one or more receivers using the calibrated array model to identify a location of an emitter.

10. The computer program product of claim 9, wherein the geolocation is Copy-Aided Geolocation (CAGL).

11. The computer program product of claim 9, wherein the one or more receivers are part of a cellular base station and the emitter is a cell phone.

12. The computer program product of claim 9, wherein the one or more receivers are indoors and the emitter is an RFID tagged product or person.

13. The computer program product of claim 9, wherein the one or more receivers are on an airborne platform.

* * * * *